(12) United States Patent
Netecke et al.

(10) Patent No.: US 11,326,693 B2
(45) Date of Patent: May 10, 2022

(54) LUBRICATION SYSTEM FOR A PISTON PUMP

(71) Applicant: Cameron International Corporation, Houston, TX (US)

(72) Inventors: Michael Raymond Netecke, Spring, TX (US); Ban Q. Tran, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 16/789,454

(22) Filed: Feb. 13, 2020

(65) Prior Publication Data

US 2021/0254712 A1 Aug. 19, 2021

(51) Int. Cl.
| | |
|---|---|
| *F16J 1/08* | (2006.01) |
| *F16J 15/18* | (2006.01) |
| *F04B 53/14* | (2006.01) |
| *F04B 39/02* | (2006.01) |
| *F04B 39/04* | (2006.01) |
| *F16J 15/324* | (2016.01) |
| *F04B 53/18* | (2006.01) |

(52) U.S. Cl.
CPC .............. *F16J 1/08* (2013.01); *F04B 39/0292* (2013.01); *F04B 39/04* (2013.01); *F04B 39/042* (2013.01); *F04B 53/143* (2013.01); *F04B 53/18* (2013.01); *F16J 15/182* (2013.01); *F16J 15/324* (2013.01); *F05B 2260/98* (2013.01)

(58) Field of Classification Search
CPC .... F04B 39/0292; F04B 39/04; F04B 39/042; F04B 53/143; F04B 15/18; F16J 1/08; F16J 9/00; F16J 15/324
See application file for complete search history.

(56) References Cited

U.S. PATENT DOCUMENTS

| | | | | | |
|---|---|---|---|---|---|
| 2,361,316 | A | * | 10/1944 | Newton | F04B 23/06 417/298 |
| 2,367,185 | A | * | 1/1945 | Cary | F16J 1/006 92/87 |
| 3,104,619 | A | * | 9/1963 | Swarthout | F04B 53/143 92/87 |
| 3,279,383 | A | * | 10/1966 | Smith | F04B 53/143 417/234 |
| 3,720,140 | A | * | 3/1973 | Lee | F04B 53/143 92/87 |
| 3,818,807 | A | * | 6/1974 | Semple | F04B 53/143 92/86.5 |
| 4,157,057 | A | * | 6/1979 | Bailey | F04B 53/143 92/87 |

(Continued)

*Primary Examiner* — Kenneth Bomberg
*Assistant Examiner* — Matthew Wiblin
(74) *Attorney, Agent, or Firm* — Kelly McKinney (57) ABSTRACT

A piston assembly for a piston pump includes an actuator rod, a piston coupled to the actuator rod and configured to contact a radially-inner wall of a cylinder, and a piston support structure coupled to the actuator rod and configured to contact the radially-inner wall of the cylinder. A fluid channel extends through the actuator rod and the piston support structure, and the fluid channel is configured to deliver a lubricating fluid to an annular space positioned between the piston and the piston support structure along an axial axis of the piston assembly.

16 Claims, 7 Drawing Sheets

(56) References Cited

U.S. PATENT DOCUMENTS

| | | | | |
|---|---|---|---|---|
| 4,270,440 A * | 6/1981 | Lewis, II | ............. | F04B 53/143 |
| | | | | 92/182 |
| 4,598,630 A * | 7/1986 | Kao | ......................... | F04B 3/00 |
| | | | | 92/129 |
| 4,976,591 A * | 12/1990 | Rivas | ...................... | F04B 25/02 |
| | | | | 417/228 |
| 5,778,759 A * | 7/1998 | Johnson | ..................... | F16J 1/12 |
| | | | | 92/129 |
| 8,770,091 B2 * | 7/2014 | Lindekleiv | ............... | F16J 1/008 |
| | | | | 92/174 |
| 9,581,154 B2 * | 2/2017 | Wang | ..................... | F04B 53/08 |
| 9,879,519 B2 * | 1/2018 | Roberson | ................ | E21B 47/10 |
| 2008/0257143 A1 * | 10/2008 | Leman | ................. | F04B 53/143 |
| | | | | 92/5 R |

\* cited by examiner

LUBRICATION SYSTEM FOR A PISTON PUMP

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Natural resources, such as oil and gas, are used as fuel to power vehicles, heat homes, and generate electricity, in addition to various other uses. Once a desired resource is discovered below the surface of the earth, drilling systems are often employed to access the desired resource and production systems are often employed to extract the desired resource. These drilling systems and/or production systems may be located onshore or offshore depending on the location of the desired resource. Further, such drilling systems and/or production systems may include a wide variety of components, such as various casings, fluid conduits, valves, pumps, and the like. For example, a drilling system may include a pump (e.g., piston pump) that may be utilized to pump drilling fluid (e.g., mud) from a surface tank into a drill string during drilling operations.

BRIEF DESCRIPTION OF THE DRAWINGS

Various features, aspects, and advantages of the present disclosure will become better understood when the following detailed description is read with reference to the accompanying figures in which like characters represent like parts throughout the figures, wherein.

DETAILED DESCRIPTION OF SPECIFIC EMBODIMENTS

One or more specific embodiments of the present disclosure will be described below. These described embodiments are only exemplary of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present embodiments are generally directed to pump systems (e.g., piston pump systems) that may be used within a drilling system. In particular, certain embodiments include a pump system with a pump that includes a piston assembly having a piston (e.g., piston cup, swab), a piston support structure (e.g., piston backer), and an actuator rod coupled to the piston and the piston support structure. The piston assembly is configured to reciprocate within a cylinder to thereby pump a pumped fluid (e.g., drilling fluid, cement). The piston assembly may include features (e.g., features of a lubrication system, such as one or more fluid channels) that enable placement of a volume of lubricating fluid (e.g., a pressurized volume of fluid; any suitable lubricating fluid, such as oil) in an annular space located between the piston and the piston support structure along an axial axis of the piston assembly.

The volume of lubricating fluid may contact the cylinder and act as a barrier (e.g., an additional barrier, such as in addition to a seal that may be formed between the piston and the cylinder and/or a seal that may be formed between the piston support structure and the cylinder) that blocks the pumped fluid from flowing across the piston assembly toward a power end portion (e.g., drive system) of the pump system, thereby protecting the power end portion of the pump system and/or making cleaning operations easier, for example. In some embodiments, the one or more fluid channels may extend through the actuator rod and the piston support structure, and the one or more channels may thereby enable the lubricating fluid to act as a cooling fluid (e.g., to cool components of the piston assembly). The disclosed embodiments may advantageously enable the pump system to reliably pump certain types of fluid, such as cement. Furthermore, the disclosed embodiments may advantageously enable the pump system to pump certain types of fluid, such as cement, at certain times and to pump other types of fluid, such as drilling fluid, at other times. In such cases, the drilling system may include fewer pumps and have a smaller footprint, for example.

Figure 1:
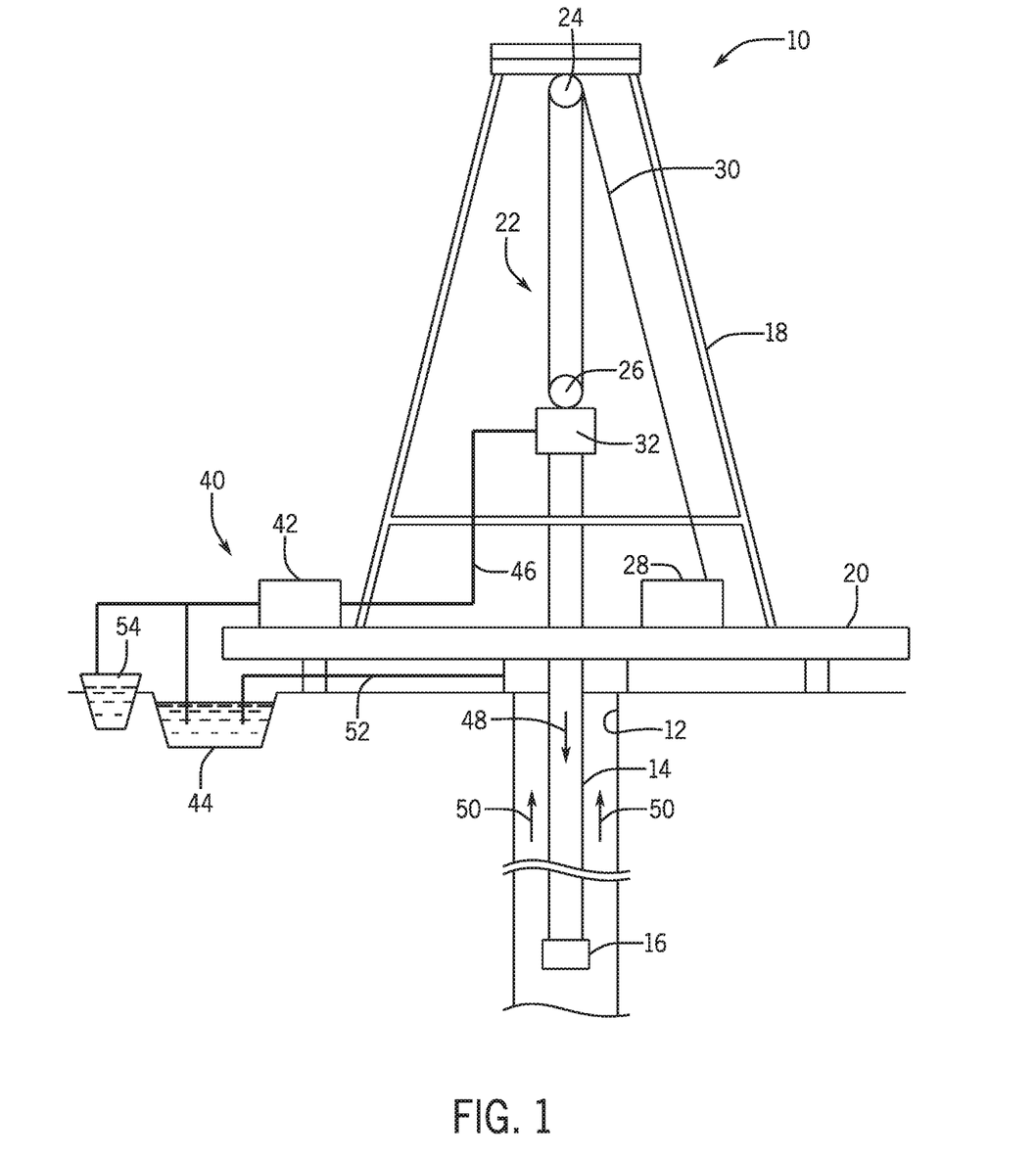
FIG. 1 is a schematic diagram of a portion of a drilling system, in accordance with an embodiment of the present disclosure.

With the foregoing in mind, FIG. 1 is a schematic diagram of a drilling system 10, in accordance with an embodiment of the present disclosure. As shown, a wellbore 12 is formed in a subsurface formation, and a drill string 14 is suspended within the wellbore 12. The drill string 14 may include a drill bit 16 that cuts through the subsurface formation to form or to drill the wellbore 12. The system 10 includes a mast 18 positioned on a drill floor 20 and over the wellbore 12. A hoisting system 22 includes a crown block 24, a traveling block 26, and a drawworks system 28. A cable 30 (e.g., wire) extends from the drawworks system 28 and couples the crown block 24 to the traveling block 26. In the illustrated embodiment, a top drive 32 is coupled to the traveling block 26. The top drive 32 rotates the drill string 14 as the hoisting system 22 raises and lowers the top drive 32 and the drill string 14 relative to the drill floor 20 to facilitate drilling of the wellbore 12. It should be appreciated that hoisting systems having various other components (e.g., swivels) and configurations may be utilized in the drilling system 10.

The drilling system 10 also includes a pump system 40 (e.g., piston pump system) having a pump 42 (e.g., piston pump) that pumps at least one type of pumped fluid, such as a drilling fluid (e.g., mud; water-based, oil-based, or synthetic-based drilling fluid) and/or a cement (e.g., a fluid that sets, hardens, solidifies, and/or binds over time and/or due to a reaction) into the wellbore 12. For example, the pump 42 may be used to pump the drilling fluid from a drilling fluid tank 44 during drilling operations. In particular, the pump 42 may be used to pump the drilling fluid from the drilling fluid tank 44, through a fluid conduit 46 (e.g., pipe), through a port in the top drive 32, and into an interior channel in the drill string 14, as shown by arrow 48. The drilling fluid may exit the drill string 14 via ports in the drill bit 16, and then circulate upwardly through an annulus between an outer surface (e.g., annular surface) of the drill string 14 and an inner surface (e.g., annular surface) that defines the wellbore 12, as shown by arrows 50. The drilling fluid may then return to the drilling fluid tank 44 via a fluid conduit 52 (e.g., pipe). The drilling fluid may lubricate the drill bit 16, may carry formation cuttings toward the surface, and/or may maintain hydrostatic pressure within the wellbore 12.

Additionally or alternatively, the pump 42 may be used to pump the cement from a cement tank 54 (e.g., a mixing tank) during cementing operations. For example, in some embodiments, the pump 42 may be used to pump the drilling fluid from the drilling fluid tank 44 over a first time period and may be used to pump the cement from the cement tank 54 over a second time period (e.g., subsequent to the pump 42 being used to pump the drilling fluid from the drilling fluid tank 44). In such cases, some components of the pump system 40 shown in FIG. 1 may be reused during the cementing operations and/or some components of the pump system 40 shown in FIG. 1 may be replaced during the cementing operations. For example, the pump 42 may pump the cement from the cement tank 54 through a fluid conduit (e.g., the fluid conduit 46 or another fluid conduit that replaces the fluid conduit 46), through a port in a cementing head (e.g., that replaces the top drive 32), through an interior of a casing string positioned within the wellbore 12, and then into an annulus between an outer surface (e.g., annular surface) of the casing string and the inner surface of the wellbore 12. The cement may set within the annulus between the outer surface of the casing string and the inner surface of the wellbore 12, thereby sealing the annulus between the outer surface of the casing string and the inner surface of the wellbore 12. It should be appreciated that the pump 42 may pump the cement from the cement tank 54 to plug the wellbore 12 or to carry out various other types of cementing operations. While FIG. 1 illustrates a land-based drilling system 10 to facilitate discussion, it should be understood that the disclosed embodiments may be adapted for use within an offshore drilling system.

Regardless of the number and/or type(s) of pumped fluid handled by the pump 42, the pump 42 may include a lubrication system and a piston assembly. As discussed in more detail below, the lubrication system may include features that are incorporated into the piston assembly to block passage of the pumped fluid across the piston assembly (e.g., from a fluid end portion of the pump 42) toward a power end portion of the pump 42), thereby protecting components of the pump 42, for example. In particular, the lubrication system may include features that are incorporated into the piston assembly to create a volume of lubricating fluid proximate to the piston assembly, and the volume of lubricating fluid may act as a barrier to the pumped fluid. It should be appreciated that the lubrication system may be particularly advantageous while the pump 42 is used to pump certain types of pumped fluid, such as cement. For example, by blocking the passage of cement across the piston assembly, the cement may not travel toward and/or set near the power end portion of the pump 42. However, the lubrication system may be utilized with any type of pumped fluid.

Figure 2:
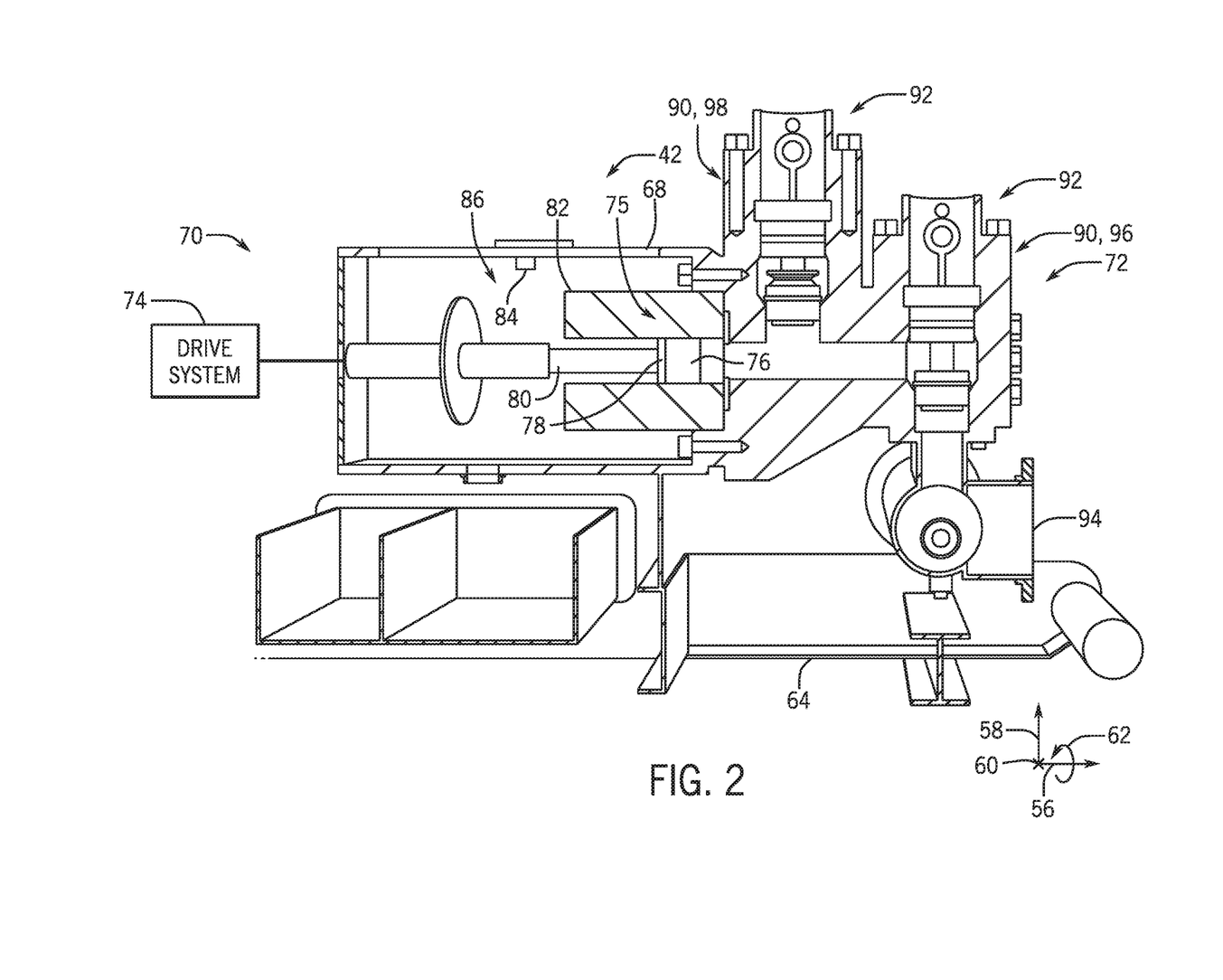
FIG. 2 is a side view of a pump that may be used in the drilling system of FIG. 1, in accordance with an embodiment of the present disclosure.

FIG. 2 is a cross-sectional side view of the pump 42 that may be used in the drilling system 10 of FIG. 1. To facilitate discussion, the pump 42 and its components may be described with reference to an axial axis or direction 56, a radial axis or direction 58, a lateral axis or direction 60, and a circumferential axis or direction 62.

In the illustrated embodiment, the pump 42 is supported on a skid 64 (e.g., support structure) and includes a frame 68 (e.g., main frame) that is coupled to the skid 64. The pump 42 extends from a power end portion 70 to a fluid end portion 72. The power end portion 70 may include components of a drive system 74 (e.g., motor, gears, and/or crankshaft assembly that coverts rotation into reciprocating motion to drive one or more piston assemblies 75 back and forth along the axial axis 56). Each of the one or more piston assemblies 75 may include a piston 76 (e.g., piston cup, swab), a piston support structure 78 (e.g., piston backer), and an actuator rod 80. The piston 76 and the piston support structure 78 may be coupled to the actuator rod 80 and may move within a cylinder 82 that is coupled to (e.g., fixed relative to) the frame 68 of the pump 42. The piston 76 may contact the pumped fluid, and the piston support structure 78 may be positioned behind the piston 76 (e.g., closer to the power end portion 70).

As discussed in more detail below, the pump 42 may include the lubrication system having features within the piston assembly 75. For example, a fluid channel may extend through the actuator rod 80 and through the piston support structure 78 to deliver a lubricating fluid (e.g., any suitable lubricating fluid, such as oil) to an annular space located between the piston 76 and the piston support structure 78 along the axial axis 56. Thus, a volume of lubricating fluid in the annular space may act as a barrier to pumped fluid and block passage of the pumped fluid across the piston assembly 75 from the fluid end portion 72 toward the power end portion 70 of the pump 42. In some embodiments, the pump 42 may include a liner wash system 84, which may spray a fluid (e.g., water) within the liner wash area 86 of the pump 42 to cool the piston assembly 75. In such cases, the liner wash system 84 may operate in coordination with the lubrication system. In some embodiments, the pump 42 may be devoid of the liner wash system 84, and the lubrication system may replace the liner wash system 84 to lubricate and/or cool the components of the piston assembly 75, for example.

As shown, the fluid end portion 72 may include the one or more piston assemblies 75, one or more modules 90 (e.g., housings) surrounding and/or supporting one or more valves 92 (e.g., one-way check valves), and one or more fluid inlets 94 (e.g., suction manifold) through which the pumped fluid (e.g., drilling fluid, cement) is drawn (e.g., suctioned) into the one or more modules 90 to be pumped (e.g., discharged) toward the wellbore 12 (e.g., FIG. 1). The frame 68 surrounds (e.g., houses or covers) the one or more piston assemblies 75, and the frame 68 is coupled to the one or more modules 90. As shown in the illustrated embodiment, each piston assembly 75 is associated with a suction module 96 and a discharge module 98 that are coupled to one another. In operation, the reciprocating motion of the piston 76 draws the pumped fluid in through a corresponding fluid inlet 94 and a corresponding suction module 96 and then forces the pumped fluid out through a corresponding fluid outlet or discharge manifold extending from a corresponding discharge module 98 (e.g., positioned out of view behind the discharge module 98 along the lateral axis 60 in FIG. 2).

In the cross-section of FIG. 2, only one piston assembly 75 and its corresponding modules 90 are shown. However, it should be appreciated that the pump 42 may include multiple piston assemblies 75 and corresponding modules 90 distributed along the lateral axis 60 (e.g., side-by-side along the lateral axis 60). Furthermore, while each piston assembly 75 has two corresponding modules 90 (e.g., the suction module 96 and the discharge module 98) in FIG. 2, it should be appreciated that each piston assembly 75 may have any number of corresponding modules 90, including only one corresponding module 90 having a different valve structure to enable suction and discharge functionality. In the illustrated embodiment, different types of pumped fluid (e.g., drilling fluid and cement; at different times) may be drawn in through the same suction module 96 and discharged through the same discharge module 98; however, other configurations are envisioned.

Figure 3:
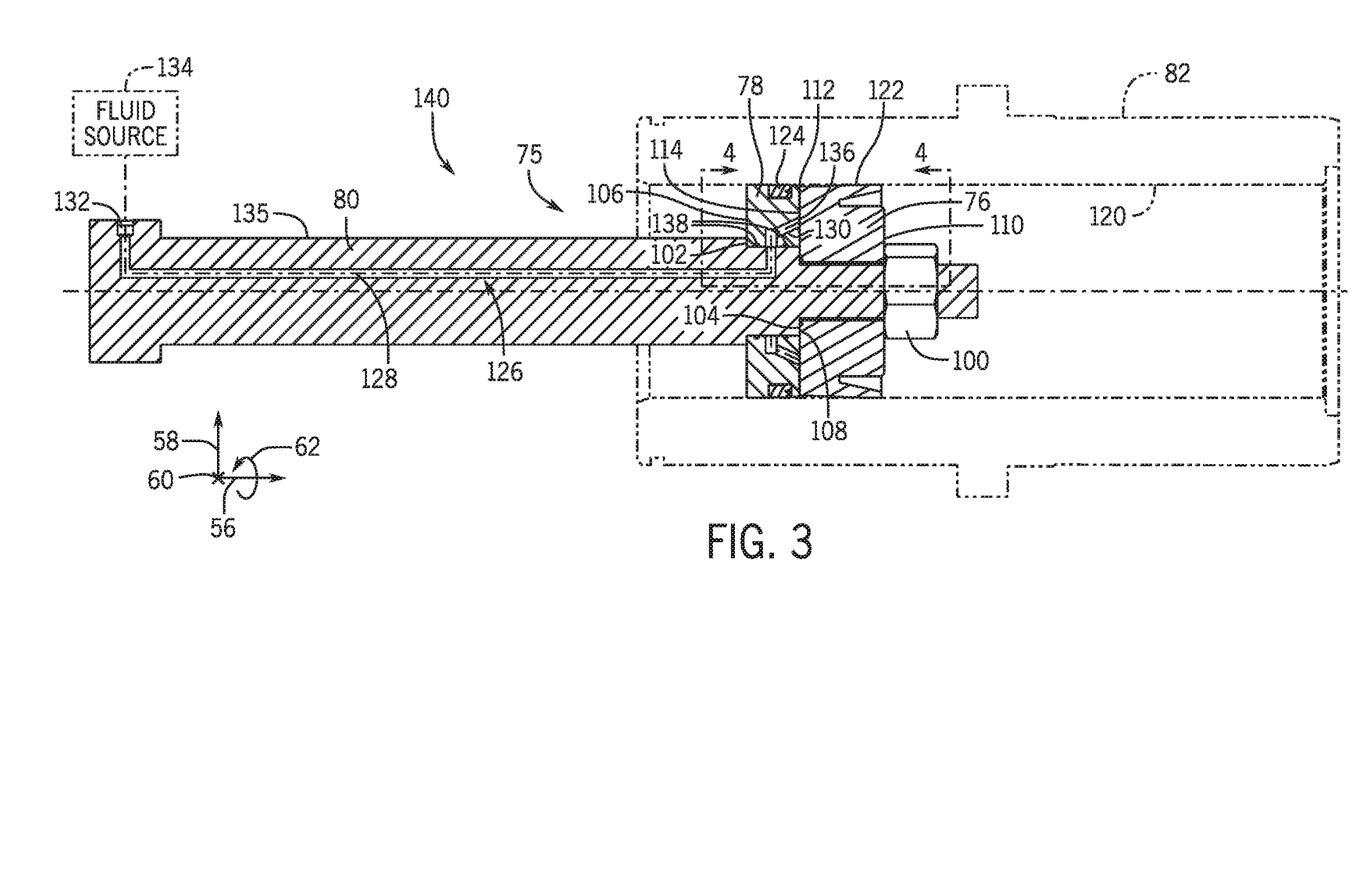
FIG. 3 is a side view of a piston assembly that may be used in the pump of FIG. 2, in accordance with an embodiment of the present disclosure.
Figure 4:
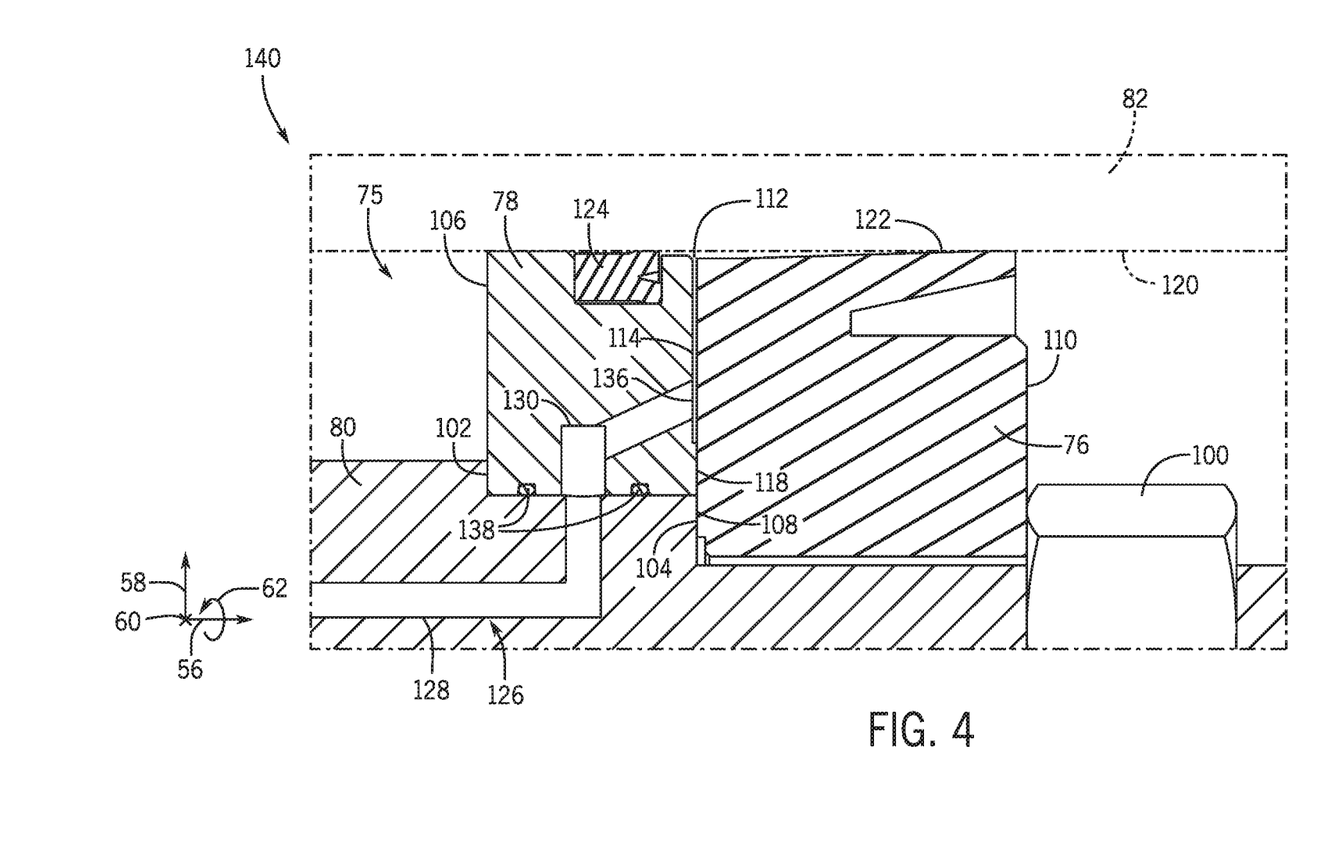
FIG. 4 is a side view of a portion of the piston assembly of FIG. 3 taken within line 4-4 of FIG. 3, in accordance with an embodiment of the present disclosure.

FIG. 3 is a side view of an embodiment of the piston assembly 75 that may be used in the pump 42 (FIG. 2), and FIG. 4 is a side view of a portion of the piston assembly 75 of FIG. 3 taken within line 4-4 of FIG. 3. The piston 76 and the piston support structure 78 may be coupled to the actuator rod 80, such that the piston 76 and the piston support structure 78 move with the actuator rod 80 back and forth along the axial axis 56. The piston 76 and the piston support structure 78 may be coupled to the actuator rod 80 via any of a variety of techniques (e.g., welding, threaded interfaces, fasteners, and/or shoulders). For example, in the illustrated embodiment, the piston 76 and the piston support structure 78 are coupled to the actuator rod 80 via a fastener 100 (e.g., nut) that is threadably coupled to the actuator rod 80 and via one or more shoulders 102, 104. In particular, when the piston assembly 75 is in an assembled configuration, the piston 76 and the piston support structure 78 are retained between the fastener 100 and the shoulder 102. In some embodiments, when the piston assembly 75 is in the assembled configuration, a surface 106 (e.g., axially-facing surface) of the piston support structure 78 may contact the shoulder 102, a surface 108 (e.g., axially-facing surface) of the piston 76 may contact the shoulder 104, and/or a surface 110 (e.g., axially-facing surface) of the piston 76 may contact the fastener 100. The piston 76 and/or the piston support structure 78 may be annular structures that circumferentially surround the actuator rod 80.

As best shown in FIG. 3, when the piston assembly 75 is in the assembled configuration, a space 112 (e.g., annular space or gap) may exist between the surface 108 of the piston 76 and a surface 114 (e.g., axially-facing surface) of the piston support structure 78. In some embodiments, a radially-inner portion of the surface 108 of the piston 76 and a radially-inner portion of the surface 114 of the piston support structure 78 may contact one another, while a radially-outer portion of the surface 108 of the piston 76 and a radially-outer portion of the surface 114 of the piston support structure 78 may be separated from one another (e.g., along the axial axis 56) to form the space 112. Such a configuration may maintain the space 112 during operation of the pump 42 (FIG. 2).

It should be appreciated that the radially-inner portion of the surface 108 of the piston 76 and the radially-inner portion of the surface 114 of the piston support structure 78 may be bonded (e.g., adhered) to one another. Furthermore, while the piston 76 and the piston support structure 78 are illustrated as physically separate components, it should be appreciated that the piston 76 and the piston support structure 78 may be formed together as a one piece structure (e.g., integrally formed). In some embodiments, the piston 76 and the piston support structure 78 may be formed from different materials (e.g., the piston 76 may be formed from an elastomer material and/or the piston support structure 78 may be formed from a metal [e.g., metal or metal alloy] material).

As shown, the space 112 may be open to a radially-inner surface 120 of the cylinder 82. Although some of the lubricating fluid may escape from the space 112 during operation of the pump 42 (FIG. 2), the space 112 may be sealed (e.g., fluid within the space 112 may be blocked from exiting the space 112) by and/or generally defined by the radially-inner surface 120 of the cylinder 82, the radially-outer portion of the surface 108 of the piston 76, the radially-outer portion of the surface 114 of the piston support structure 78, an interface 118 (e.g., which may include sealing elements and/or radially-facing surface(s) of the piston 76 and/or the piston support structure 78) between the radially-inner portion of the surface 108 of the piston 76 and the radially-inner portion of the surface 114 of the piston support structure 78, a sealing edge 122 (e.g., radially-outer edge; annular edge) of the piston 76 that is configured to contact the radially-inner surface 120 of the cylinder 82, and a sealing edge 124 (e.g., radially-outer edge; annular edge) of the piston support structure 78 that is configured to contact the radially-inner surface 120 of the cylinder 82. Thus, the sealing edges 122, 124 may facilitate retention of the lubricating fluid within the space 112. It should be appreciated that the sealing edges 122, 124 may have any suitable configuration. For example, in the illustrated embodiment, the sealing edge 122 of the piston 76 is a radially-outer edge of a body of the piston 76, and the sealing edge 124 of the piston support structure 78 is a sealing element (e.g., annular sealing element; elastomer sealing element) that is supported in a groove (e.g., annular groove).

In the illustrated embodiment, a fluid channel 126 extends through the actuator rod 80 and the piston support structure 78. In particular, one portion 128 (e.g., actuator rod portion) of the fluid channel 126 extends through the actuator rod 80 and another portion 130 (e.g., support structure portion) extends through the piston support structure 78. The fluid channel 126 includes an inlet 132 that is configured to receive the lubricating fluid from a fluid source 134 and an outlet 136 that is configured to deliver the lubricating fluid to the space 112. As shown, the inlet 132 is formed in a radially-outer surface 135 of the actuator rod 80, and the outlet 136 is formed in the radially-outer portion of the surface 114 of the piston support structure 78; however, other configurations and locations of the inlet 132 and/or the outlet 136 are envisioned to deliver the lubricating fluid to the space 112.

In the illustrated embodiment, the portion 128 of the fluid channel 126 within the actuator rod 80 is a linear channel (e.g., a central axis extends along the axial axis 56), while the portion 130 of the fluid channel 126 within the piston support structure 78 is an annular channel (e.g., extends circumferentially within the piston support structure 78). Thus, the portion 130 of the fluid channel 126 forms the annular channel and the outlet 136 forms an annular outlet, and the annular channel and the annular outlet extend circumferentially about the actuator rod 80. Such a configuration may enable the fluid channel 126 to effectively distribute the lubricating fluid throughout the space 112. It should be appreciated that the fluid channel 126 may include other configurations, such as the portion 128 may include multiple linear channels that are distributed circumferentially about the actuator rod 80, the portion 130 may include one or more channels that are distributed circumferentially about the actuator rod 80, or the like.

As shown, the portion 128 of the fluid channel 126 that extends through the actuator rod 80 may bend (e.g., radially-outwardly, approximately 90 degrees) to align with and to fluidly coupled to the portion 130 of the fluid channel 126 that extends through the piston support structure 78. Thus, the portions 128, 130 may each include sub-portions that extend along the radial axis 58 to fluidly couple the portions 128, 130 to one another. The portion 130 of the fluid channel 126 that extends through the piston support structure 78 may also include at least one sub-portion that extends along the axial axis 56 (e.g., has a central axis that is aligned with the axial axis 56, or is angled relative to the axial axis 56 with a component along the axial axis 56) to position the outlet 136 at the radially-outer portion of the surface 114 of the piston support structure 78 to enable the fluid channel 126 to deliver the lubricating fluid to the space 112. As shown, sealing elements 138 (e.g., annular sealing elements) may be provided about an interface between the portions 128, 130 of the fluid channel 126.

In operation, the lubricating fluid may be provided from the fluid source 134 into the inlet 132 of the fluid channel 126. The lubricating fluid may flow through the fluid channel 126 and into the space 112. The lubricating fluid may fill the space 112, and may thus provide a volume of lubricating fluid in the space 112 that may act as a barrier and that may block fluids (e.g., pumped fluids) from passing across the piston assembly 75. In some embodiments, the volume of lubricating fluid within the space 112 may act as an additional seal or a redundant seal. For example, the volume of lubricating fluid within the space 112 may act as one seal that blocks fluids (e.g., pumped fluids) from passing across the piston assembly 75, while the sealing edge 122 of the piston 76 may provide one seal that blocks fluids (e.g., pumped fluids) from passing across the piston assembly 75 and/or while the sealing edge 124 of the piston support structure 78 may provide one seal that blocks fluids (e.g., pumped fluids) from passing across the piston assembly 75. In some embodiments, the piston assembly 75 may therefore provide multiple seals, including one liquid or fluid seal (e.g., formed by the volume of lubricating fluid in the space 112), to block fluids (e.g., pumped fluids) from passing across the piston assembly 75. Such a configuration may be particularly desirable when the pumped fluid is cement, for example. However, the configuration may be desirable and useful when the pumped fluid is any of a variety of fluids, including drilling fluid. The features that enable use of the lubricating fluid in the manner disclosed herein may be considered to be part of a lubricating system 140 (e.g., fluid or liquid barrier system) for the pump 42 (FIG. 2).

Figure 5:
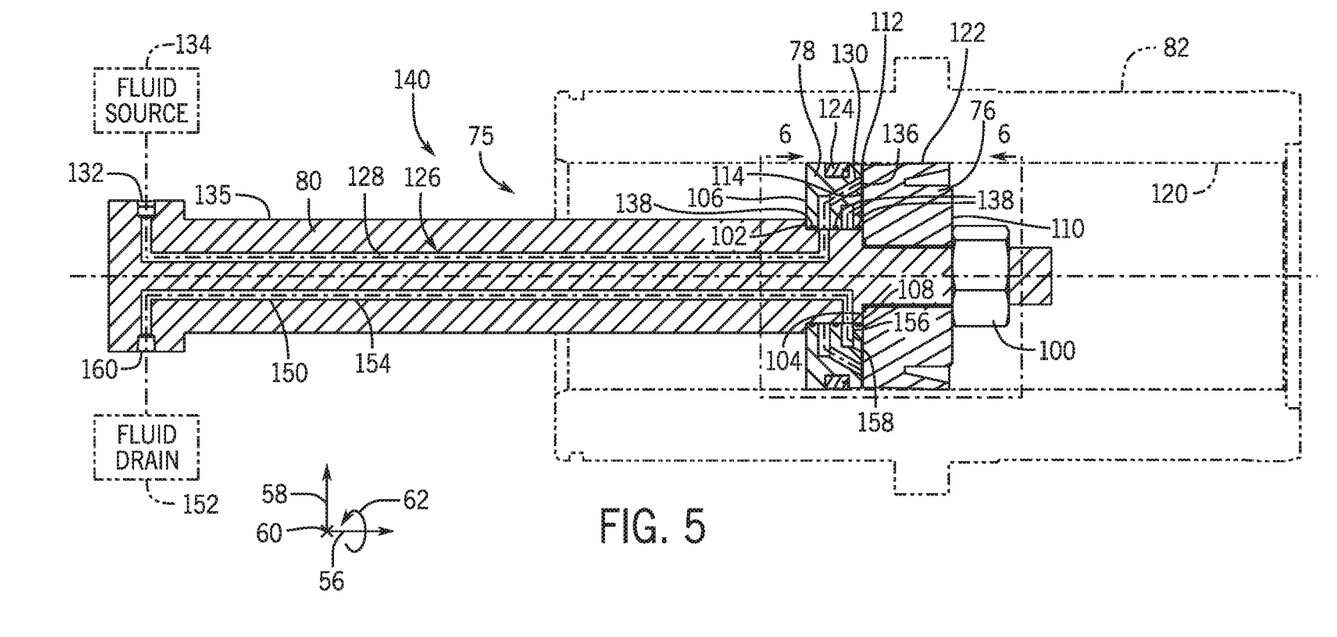
FIG. 5 is a side view of a piston assembly that may be used in the pump of FIG. 2, wherein the piston assembly includes a circulating channel, in accordance with an embodiment of the present disclosure.
Figure 6:
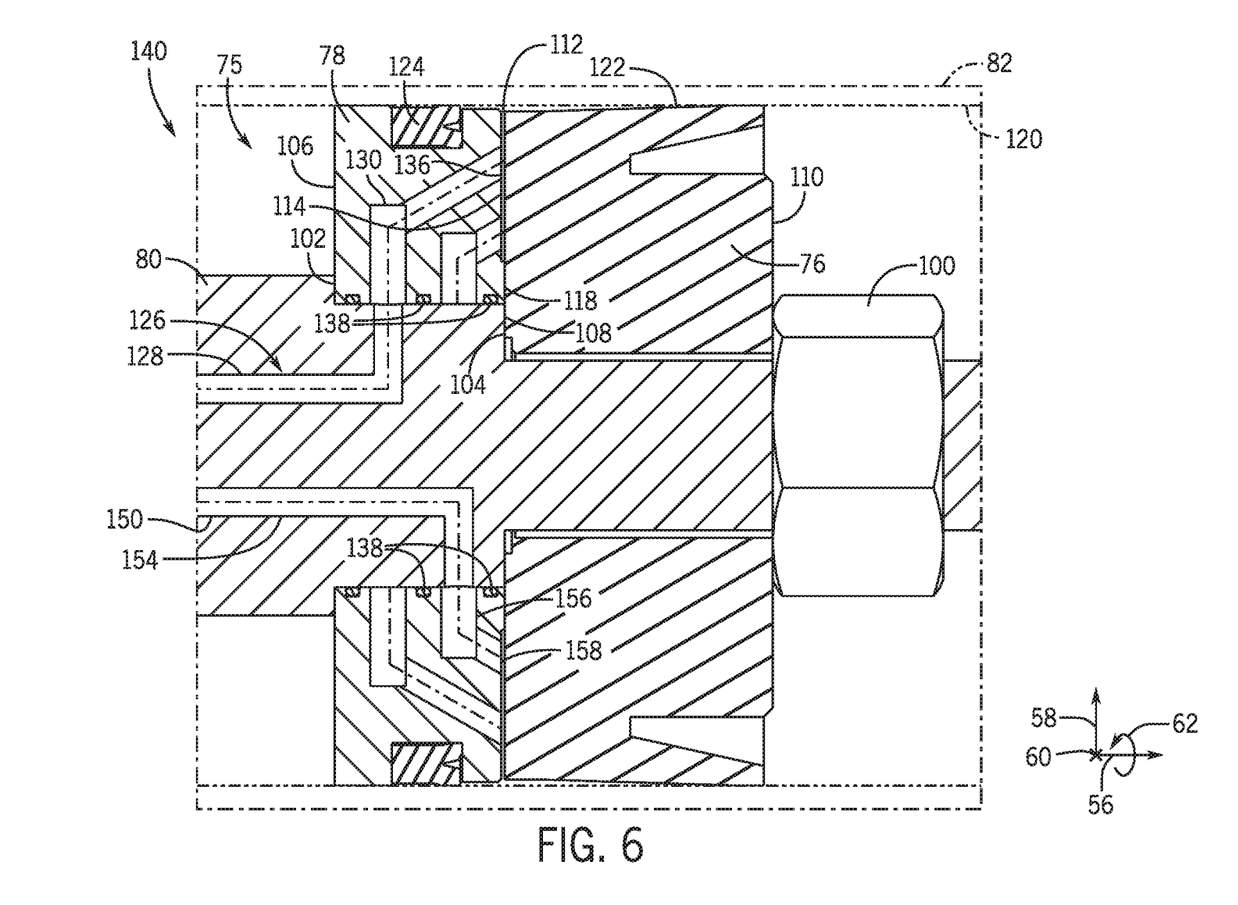
FIG. 6 is a side view of a portion of the piston assembly of FIG. 5 taken within line 6-6 of FIG. 5, in accordance with an embodiment of the present disclosure.

FIG. 5 is a side view of an embodiment of the piston assembly 75 that includes a circulating channel 150 and that may be used in the pump 42 (FIG. 2). FIG. 6 is a side view of a portion of the piston assembly 75 of FIG. 5 taken within line 6-6 of FIG. 5. The circulating channel 150 is configured to enable the lubricating fluid to flow out of the space 112 to a fluid drain 152 (e.g., fluid tank; recirculating system; the fluid source 134). Thus, in operation, the lubricating fluid may be delivered to the space 112 via the fluid channel 126 and may drain from the space 112 via the circulating channel 150 (e.g., due to a pressure differential across the circulating channel 150). The circulating channel 150 may facilitate cooling of the piston assembly 75 as relatively cool lubricating fluid may continually flow through the piston assembly 75.

In the illustrated embodiment, the circulating channel 150 extends through the actuator rod 80 and the piston support structure 78. In particular, one portion 154 (e.g., actuator rod portion) of the circulating channel 150 extends through the actuator rod 80 and another portion 156 (e.g., support structure portion) extends through the piston support structure 78. The circulating channel 150 includes an inlet 158 that is configured to receive the lubricating fluid from the space 112 and an outlet 160 that is configured to deliver the lubricating fluid to the fluid drain 152. As shown, the inlet 158 is formed in the radially-outer portion of the surface 114 of the piston support structure 78 and the outlet 160 is formed in the radially-outer surface 135 of the actuator rod 80. However, other configurations and locations of the inlet 158 and/or the outlet 160 are envisioned. In the illustrated embodiment, the portion 154 of the circulating channel 150 within the actuator rod 80 is a linear channel (e.g., a central axis extends along the axial axis 56), while the portion 156 of the circulating channel 150 within the piston support structure 78 is an annular channel (e.g., extends circumferentially within the piston support structure 78). Thus, the portion 156 of the circulating channel 150 forms the annular channel and the inlet 158 forms an annular outlet, and the annular channel and the annular outlet extend circumferentially about the actuator rod 80. Such a configuration may enable the circulating channel 150 to effectively remove the lubricating fluid from the space 112. It should be appreciated that the circulating channel 150 may include other configurations, such as the portion 154 may include multiple linear channels that are distributed circumferentially about the actuator rod 80, the portion 156 may include one or more channels that are distributed circumferentially about the actuator rod 80, or the like.

As shown, the portion 154 of the circulating channel 150 that extends through the actuator rod 80 may bend (e.g., radially-outwardly, approximately 90 degrees) to align with and to fluidly coupled to the portion 156 of the circulating channel 150 that extends through the piston support structure 78. Thus, the portions 154, 156 may each include sub-portions that extend along the radial axis 58 to fluidly couple the portions 154, 156 to one another. The portion 156 of the circulating channel 150 that extends through the piston support structure 78 may also include at least one sub-portion that extends along the axial axis 56 (e.g., has a central axis that is aligned with the axial axis 56 or that is angled relative to the axial axis 56 with a component along the axial axis 56) to position the inlet 158 at the radially-outer portion of the surface 114 of the piston support structure 78 to enable the circulating channel 150 to remove the lubricating fluid to the space 112. As shown, sealing elements 138 (e.g., annular sealing elements) may be provided about an interface between the portions 154, 156 of the circulating channel 150.

It should be appreciated that the piston assembly 75 in FIGS. 5 and 6 may include all of the features described in detail above with respect to FIGS. 3 and 4, and additionally, the piston assembly 75 in FIGS. 5 and 6 includes the circulating channel 150. In some embodiments, the features described in detail above with respect to FIGS. 3 and 4, may be modified and/or relocated to accommodate the circulating channel 150. For example, the interface between the portions 128, 130 of the fluid channel 126 may be moved away from a center portion of the piston support structure 78 (e.g., along the axial axis 56, as compared to FIGS. 3 and 4) to provide sufficient space for an interface between the portions 154, 156 of the circulating channel 150. As shown, the interface between the portions 128, 130 of the fluid channel 126 is positioned to be closer to the power end portion 70 (FIG. 2) of the pump 42 (FIG. 2) compared to the interface between the portions 154, 156 of the circulating channel 150. Additionally, as shown, the outlet 136 of the fluid channel 126 is positioned radially outwardly of the inlet 158 of the circulating channel 150. However, in other embodiments, the interface between the portions 128, 130 of the fluid channel may be positioned to be further from the power end portion 70 (FIG. 2) of the pump 42 (FIG. 2) compared to the interface between the portions 154, 156 of the circulating channel 150 and/or the outlet 136 of the fluid channel 126 may be positioned radially inwardly of the inlet 158 of the circulating channel 150. The circulating channel 150 may be considered to be part of the lubrication system 140.

As noted above, the lubrication system 140 (e.g., with or without the circulating channel 150) may be configured to cool the piston assembly 75. With reference to FIG. 2, it should be appreciated that the lubrication system 140 may be used to the cool the piston assembly 75 instead of or in addition to the liner wash system 84, which may spray a fluid (e.g., water) within the liner wash area 86 of the pump 42 to cool the piston assembly 75. For example, in some embodiments, the pump 42 may include the liner wash system 84 that is operated only at certain times (e.g., during periods of high temperature, as indicated by a sensor; while pumping certain types of fluids). In some such embodiments, the liner wash system 84 may only be used while pumping certain types of fluids (e.g., drilling fluid) and may not be operated while pumping other types of fluids (e.g., cement). Additionally or alternatively, the liner wash system 84 may be operated at the same time as the lubricating system 140 or may be operated at different times than the lubricating system 140 (e.g., only while the lubricating system 140 is inactive).

For example, in some embodiments, the liner wash system 84 (and not the lubricating system 140) may be used while the pump 42 pumps drilling fluid, and the lubricating system 140 (and not the liner wash system 84) may be used while the pump 42 pumps cement. In some embodiments, the liner wash system 84 (and not the lubricating system 140) may be used while the pump 42 pumps drilling fluid, and both the lubricating system 140 and the liner wash system 84 may be used while the pump 42 pumps cement. In some embodiments, both the liner wash system 84 and the lubricating system 140 may be used while the pump 42 pumps drilling fluid and while the pump 42 pumps cement. In some embodiments, the pump 42 may be devoid of the liner wash system 84 that sprays the fluid within the liner wash area 86 and/or the liner wash system 84 may be reduced in size (e.g., as compared to pumps that are devoid of the lubricating system 140).

Figure 7:
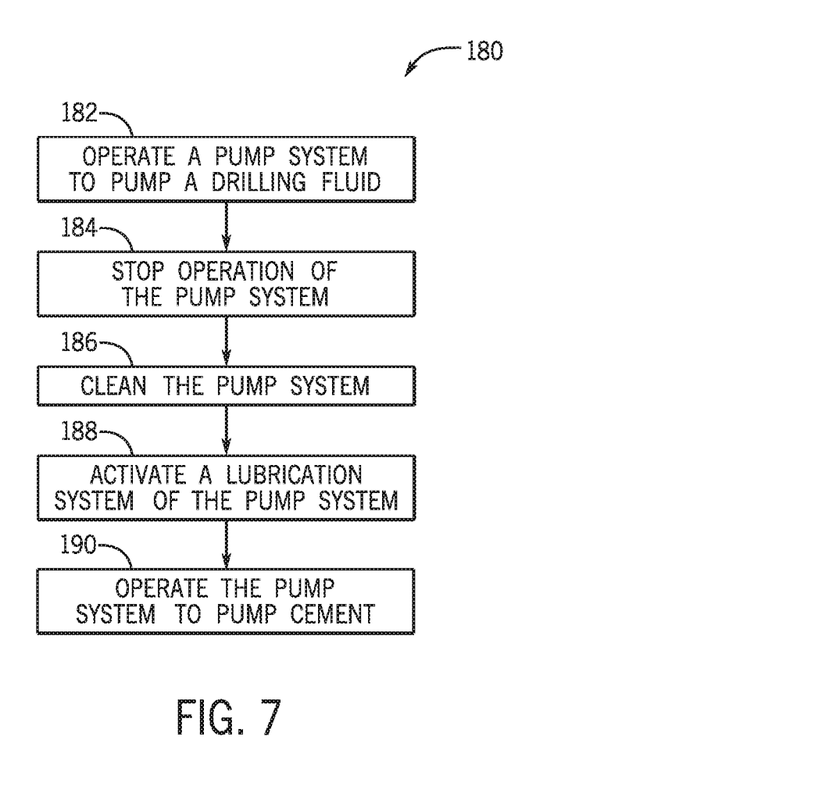
FIG. 7 is a flow diagram of a method of operating a pump having features of a lubrication system integrated into a piston assembly, in accordance with an embodiment of the present disclosure.

FIG. 7 is a flow diagram of a method 180 of operating the pump system 40. The method 180 includes various steps represented by blocks. Although the flow chart illustrates the steps in a certain sequence, it should be understood that the steps may be performed in any suitable order and certain steps may be carried out simultaneously, where appropriate. Additionally, steps may be added to or omitted from of the method 180. The discussion of the method 180 refers to certain components that are described and illustrated in FIGS. 1-6.

In step 182, the pump system 40 may be operated to pump a drilling fluid during drilling operations. In some embodiments, the liner wash system 84 may be used while the pump system 40 is operated to pump the drilling fluid during drilling operations, and the lubrication system 140 may not be used while the pump system 40 is operated to pump the drilling fluid during drilling operations. However, it should be appreciated that the liner wash system 84 (if present) and/or the lubrication system 140 may be used in any suitable manner while the pump system 40 is operated to pump the drilling fluid during drilling operations, as described above.

In step 184, the pump system 40 may be inactivated (e.g., stop pumping), such as by stopping a supply of power to the pump system 40. In step 186, the pump system 40 may be cleaned (e.g., lines flushed to clear the drilling fluid). In step 188, the lubrication system 140 may be activated (e.g., a valve may be opened to enable a flow of the lubricating fluid to the space 112) to form the volume of lubricating fluid within the space 112. In step 190, the pump system 40 may be operated to pump cement during cementing operations. In this way, the lubrication system 140 may be used during the cementing operations. The lubrication system 140 may be used instead of the liner wash system 84 (e.g., the liner wash system 84 may not be used) or in addition to the liner wash system 84 (e.g., the liner wash system 84 may also be used) during the cementing operations. However, it should be appreciated that the liner wash system 84 (if present) and/or the lubrication system 140 may be used in any suitable manner while the pump system 40 is operated to pump the cement during cementing operations, as described above.

The lubrication system 140 may provide a volume of lubricating fluid proximate to the piston assembly 75 (e.g., within the space 112 between the piston 76 and the piston support structure 78), which may provide a barrier (e.g., additional barrier) to block the passage of the cement across the piston assembly 75 from the fluid end portion 72 to the power end portion 70 of the pump 42. The lubrication system 140 may protect components of the pump 42 (e.g., components at the power end portion 70 of the pump 42). The lubrication system 140 may also enable the pump 42 to be used to pump certain types of fluid, such as cement, that may cause damage to the pump 42 if permitted to leaked into the power end portion 70 of the pump 42 (e.g., in the absence of the lubrication system 140). The lubrication system 140 may thus also enable the pump 42 to pump various types of fluid at different times (e.g., drilling fluid during drilling operations and cement during cementing operations) without resulting in damage to the pump 42 or inefficiencies in operation (e.g., without the disclosed lubrication system 140, the cement may leak into the power end portion 170 of the pump 42 and may impede not only cementing operations, but also drilling operations).

It should be appreciated that certain drilling systems (e.g., the drilling system 10 of FIG. 1) may include multiple pumps. In such cases, some or all of the multiple pumps may include the features disclosed herein to enable some or all of the multiple pumps to pump both drilling fluid and cement (e.g., at different times). For example, some drilling systems may include three piston pumps that are configured to pump drilling fluid during drilling operations. In such drilling systems, the first and second pumps may be used frequently to pump drilling fluid during drilling operations. However, the third pump may be used infrequently to pump drilling fluid (e.g., only when both the first and second pumps are unavailable). It may be desirable for at least the third pump (or in some cases, only the third pump) to be configured to include the lubrication system to enable the third pump to pump cement (e.g., with the additional barrier formed by the volume of lubricating fluid to block the ingress of the cement into the power end portion of the pump).

The pump disclosed herein is merely exemplary, and it should be appreciated that various combinations and arrangements of the features shown and described with respect to FIGS. 1-6 are envisioned. Indeed, any of the features and components of FIGS. 1-6 may be utilized together and/or combined in any suitable manner. Furthermore, the lubrication assembly and some or all of the components therein may be used in any of a variety of piston pump systems.

While the disclosure may be susceptible to various modifications and alternative forms, specific embodiments have been shown by way of example in the drawings and have been described in detail herein. However, it should be understood that the disclosure is not intended to be limited to the particular forms disclosed. Rather, the disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A piston assembly for a piston pump, comprising:
an actuator rod;
a piston coupled to the actuator rod and configured to contact a radially-inner wall of a cylinder; and
a piston support structure coupled to the actuator rod and configured to contact the radially-inner wall of the cylinder,
wherein a fluid channel extends through the actuator rod and the piston support structure, and the fluid channel is configured to deliver a lubricating fluid to an annular space positioned between the piston and the piston support structure along an axial axis of the piston assembly, and
wherein an outlet of the fluid channel is positioned at an axially-facing surface of the piston support structure.

2. The piston assembly of claim 1, wherein the piston comprises a first axially-facing surface and the piston support structure comprises a second axially-facing surface that faces the first axially-facing surface, and the annular space is defined in part by the first axially-facing surface and the second axially-facing surface.

3. The piston assembly of claim 1, wherein the piston comprises a first axially-facing surface and the piston support structure comprises a second axially-facing surface that faces the first axially-facing surface, and respective radially-inner portions of the first axially-facing surface and the second axially-facing surface contact one another, and respective radially-outer portions of the first axially-facing surface and the second axially-facing surface are separated from one another to form the annular space.

4. The piston assembly of claim 1, wherein an inlet of the fluid channel is positioned at a radially-outer surface of the actuator rod.

5. The piston assembly of claim 1, wherein the piston and the piston support structure are physically separate from one another.

6. The piston assembly of claim 1, wherein the piston support structure comprises a first sealing edge at a respective radially-outer surface of the piston support structure, and the first sealing edge is configured to seal against the radially-inner wall of the cylinder;
wherein the piston comprises a second sealing edge at a respective radially-outer surface of the piston, and the second sealing edge is configured to seal against the radially-inner wall of the cylinder.

7. The piston assembly of claim 1, wherein the piston support structure is formed from a metal material, and the piston is formed from an elastomer material.

8. The piston assembly of claim 1, wherein the piston support structure comprises an annular structure that extends circumferentially about the actuator rod.

9. The piston assembly of claim 8, wherein a portion of the fluid channel that is within the piston support structure comprises an annular fluid channel that extends circumferentially about the actuator rod.

10. The piston assembly of claim 1, comprising a circulating channel that extends through the actuator rod and the piston support structure, wherein the circulating channel is configured to facilitate removal of the lubricating fluid from the annular space.

11. A piston pump for a drilling system, comprising:
a housing; and
a piston assembly positioned within the housing, the piston assembly comprising:
a cylinder;
an actuator rod;
a piston coupled to the actuator rod and configured to contact a radially-inner wall of the cylinder; and
a piston support structure coupled to the actuator rod and configured to contact the radially-inner wall of the cylinder,
wherein a fluid channel extends through the actuator rod and the piston support structure, and the fluid channel is configured to deliver a lubricating fluid to an annular space defined at least in part by the radially-inner wall of the cylinder, the piston, and the piston support structure, and
wherein the piston and the piston support structure are stacked along an axial axis of the piston assembly such that the piston and the piston support structure do not overlap along the axial axis.

12. The piston pump of claim 11, comprising a circulating channel that extends through the actuator rod and the piston support structure, wherein the circulating channel is configured to facilitate removal of the lubricating fluid from the annular space, and a portion of the circulating channel that is within the piston support structure comprises an annular circulating channel that extends circumferentially about the actuator rod.

13. A method of operating a piston pump for a drilling system, comprising:
pumping, using the piston pump, a drilling fluid into a wellbore over a first time period;

providing, via a liner wash system of the piston pump, a wash fluid to a liner wash area at least while pumping the drilling fluid into the wellbore over the first time period;

pumping, using the piston pump, a cement into the wellbore over a second time period;

providing, via a lubricating system of the piston pump, a lubricating fluid to an annular space defined between a piston and a piston support structure of the piston pump to create a pressurized volume of the lubricating fluid in the annular space at least while pumping the cement into the wellbore over the second time period; and providing, via the lubricating system of the piston pump, the lubricating fluid to the annular space defined between the piston and the piston support structure of the piston pump while pumping the cement into the wellbore over the second time period and not while pumping the drilling fluid into the wellbore over the first time period.

14. The method of claim 13, wherein providing the lubricating fluid to the annular space comprises flowing the lubricating fluid through a fluid channel that extends through an actuator rod and the piston support structure.

15. The method of claim 14, comprising removing the lubricating fluid from the annular space via flowing the lubricating fluid through a circulating channel that extends through the actuator rod and the piston support structure.

16. The method of claim 13, comprising:

pumping, using the piston pump, the drilling fluid from a drilling fluid tank into a drill string to drill the wellbore over the first time period; and pumping, using the piston pump, the cement from a cement tank into an annulus between an outer surface of a casing string and an inner surface of the wellbore over the second time period to cement the casing string within the wellbore.

* * * * *